3,781,201
METHOD FOR SEPARATING OIL FROM A MIXTURE OF OIL AND WASTE WATER FROM AN OFFSHORE RIG

Charles J. Carmichael, 2278 Telestar St., Harvey, La. 70058, and Albert G. Franklin, 2712 Holiday Drive, New Orleans, La. 70114
Filed Jan. 24, 1972, Ser. No. 219,944
Int. Cl. B01d 15/00
U.S. Cl. 210—27                    5 Claims

ABSTRACT OF THE DISCLOSURE

The present disclosure is directed to separating oil from a mixture of oil and waste water on offshore rigs where the water cannot merely be allowed to wash overboard containing oil which pollutes the environment and endangers marine life. The mixture of oil and water is first passed through a primary skimmer tank where oil that quickly separates from water is skimmed off into a blow case and water from the bottom of the skimmer tank is fed to a mixing tank where gypsum and lime are added and the gypsum-oil and excess gypsum and other pollutants are mechanically separated from the water.

---

An object of the present invention is to provide a system or method for removing oil from waste water so that water containing no more oil than 50 p.p.m. is discharged overboard from the rig.

A further object of the invention is the introduction of gypsum and lime to the oil containing water and mechanically mixing the gypsum and lime so that the gypsum will absorb the oil and cause it to sink leaving the clean water on top.

A still further object of the present invention is to subject waste water containing oil to which has been added gypsum and lime with mixing to a mechanical separation such as a disposal caisson or a battery of centrifugal separators to remove the oil absorbed by the gypsum and to discharge such water overboard.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
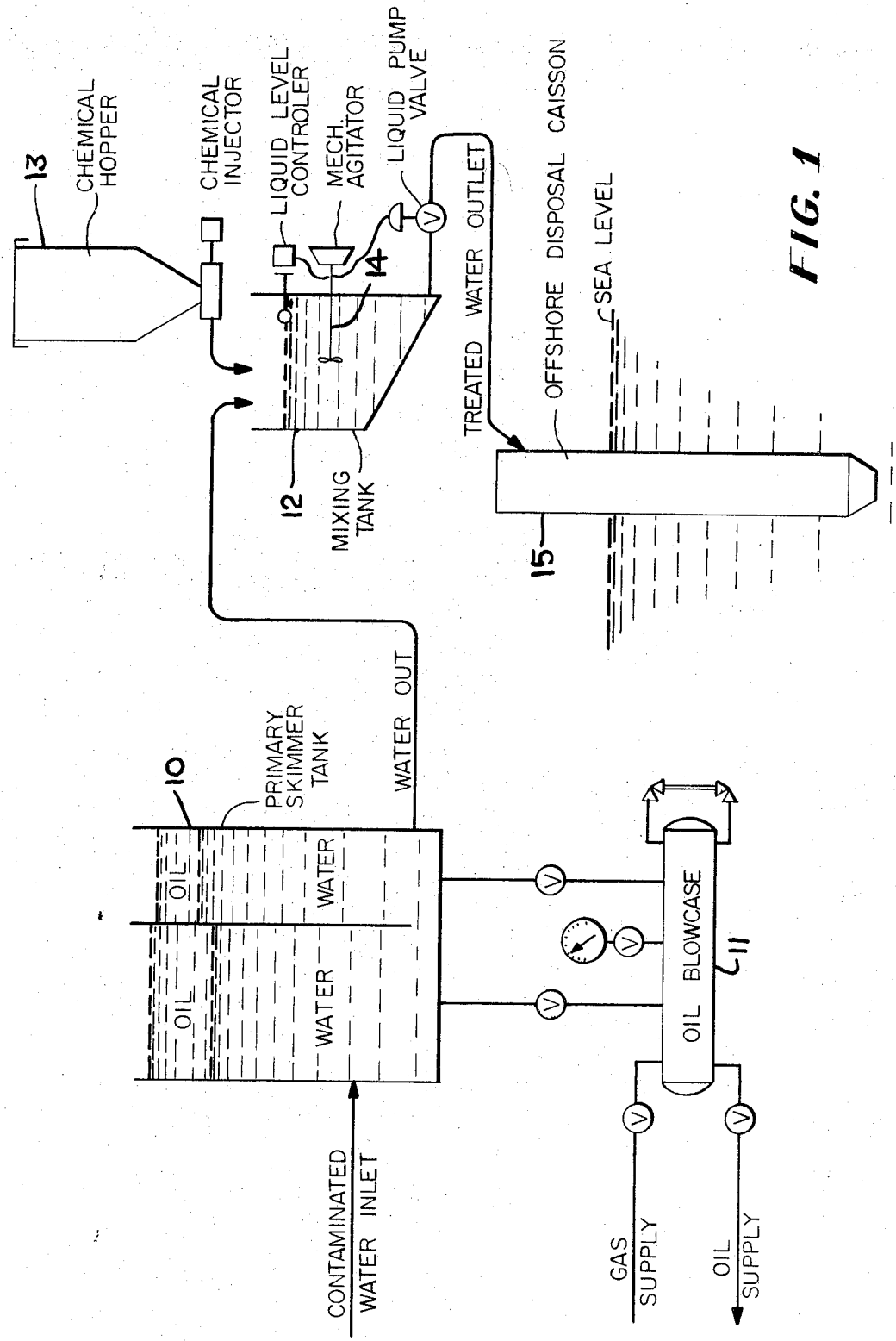
FIG. 1 is a schematic flow diagram of one form of practicing the methods of the present invention.

Referring now to FIG. 1, the produced water (oil contaminated) is taken into a primary skimmer tank 10 where any free oil that quickly separates from the water is skimmed off into a blow case 11 and eventually returned to the oil facilities on the offshore ring platform. The contaminated water then flows from tank 10 to a mixing tank 12 where the gypsum and lime are introduced from a chemical hopper 13 and mixed with the water by a mechanical mixer 14. The thus treated water is then released to a disposal caisson 15 of the type shown and described in our copending application Ser. No. 169,677, filed Aug. 6, 1971.

Figure 2:
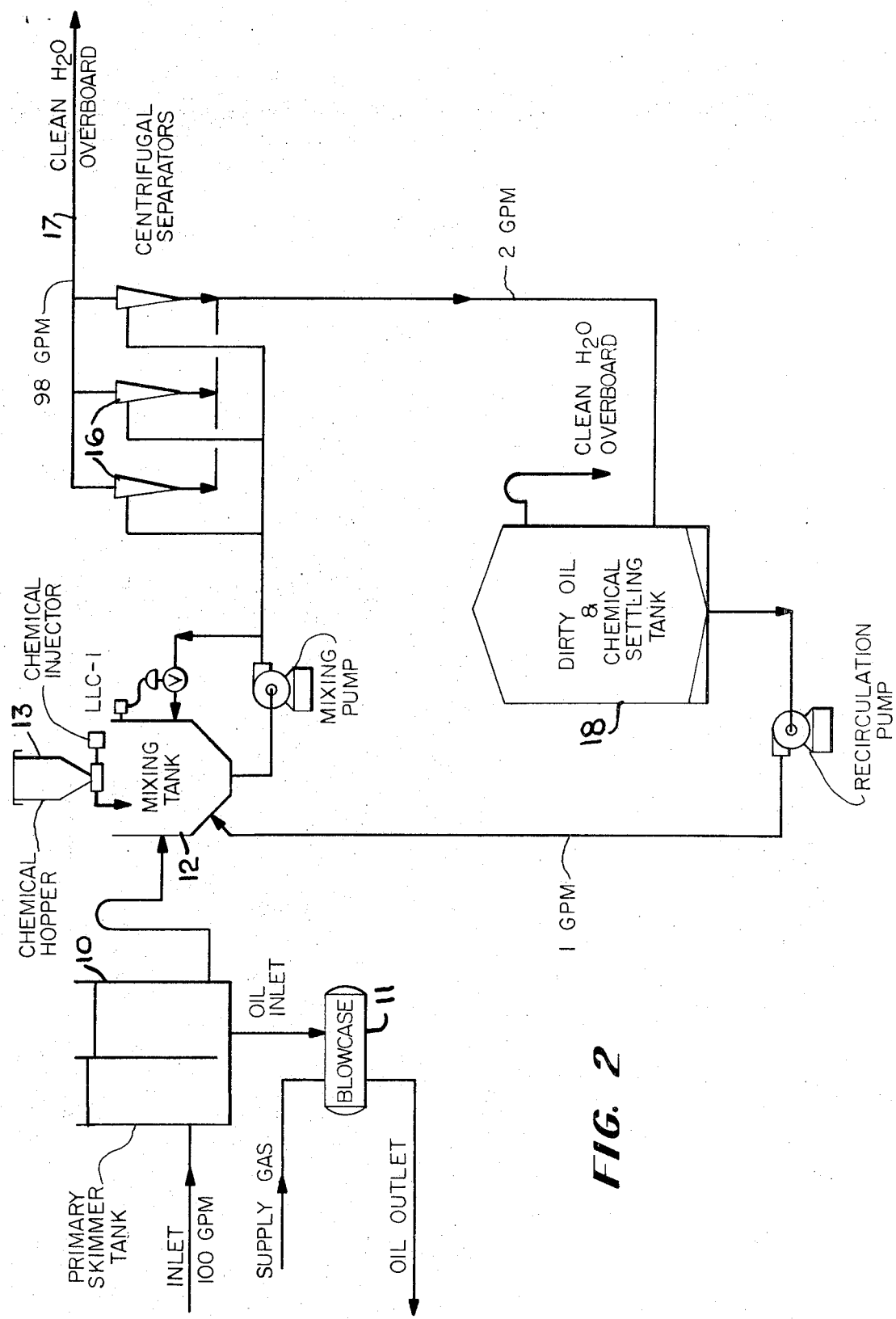
FIG. 2 is a schematic flow diagram of a modified form of practicing the present invention.

As best seen in FIG. 2, the process has the primary skimmer tank 10 and blow case 11. The blow case 11 is a pressurizable container which collects oil from the skimmer tank 10 and which has a sight glass to tell when the container is full, a gas line to pressurize the container and an oil supply line to remove oil from the blow case as it becomes full. Each of the gas and oil supply lines have valves for control. The water (oil contaminated) is then led to a mixing tank 12 where the gypsum and lime is introduced from a chemical hopper 13 and from there when the water leaves the mixing tank 12 it is pumped through cyclone type separators 16 where all solids (gypsum-oil, excess gypsum) and any other solids are removed. The clean water is then flowed overboard as at 17. The solids and a small percent of water (about 2 to 3% of the total inlet stream to the cyclone separators 16) are flowed to a retaining tank 18. Since the fluid in this tank is about 90% water and, if given sufficient time, will drop the solids, it will be possible to further remove some water by overflow spill from the tank 18. When the solids have reached a level in the retaining tank where they no longer have enough retention time to separate from the water and begin to overflow with the water, then the contents of the retaining tank 18 must be drained from the tank and hauled to shore for disposal. If desired, a portion of the liquid-solids in the retaining tank 18 could be recycled back to the chemical mixing tank 15 to use a portion of the unused gypsum.

What is claimed is:

1. The method of separating oil from a mixture of oil and waste water from an offshore rig comprising introducing the oil water mixture to a primary skimmer tank where oil that quickly separates from the water is skimmed off into a blow case, introducing water from the bottom of the primary skimmer tank into a mixing tank, introducing a mixture consisting essentially of gypsum and lime into the mixing tank and thereafter mechanically separating the gypsum-oil, excess gypsum and other solids from the water and discharging the clean water overboard.

2. The method of claim 1 wherein the mixture of gypsum and lime introduced into the mixing tank is mechanically mixed with the water taken from the primary skimmer tank.

3. The method of claim 2 wherein the mechanical separation of the gypsum-oil and excess gypsum is effected by passing the mixture through a plurality of centrifugal separators.

4. The method of claim 2 wherein the mechanical separation of the gypsum-oil and excess gypsum is effected by subjecting the mixture to a settling tank and drawing the clean water off the top thereof.

5. The method of claim 4 wherein the product from the settling tank is reintroduced into the mixing tank.

References Cited

UNITED STATES PATENTS

| | | | |
|---|---|---|---|
| 3,591,494 | 7/1971 | Crouch et al. | 210—40 |
| 3,702,297 | 11/1972 | Maksim | 210—DIG. 21 |
| 3,608,727 | 9/1971 | Grutsch | 210—DIG. 21 |
| 2,005,686 | 9/1938 | Conrad | 210—40 X |
| 3,600,307 | 8/1971 | Keboe et al. | 210—40 X |
| 3,405,059 | 10/1968 | Sprow | 210—40 |
| 3,484,371 | 12/1968 | Biegler et al. | 210—40 |
| 3,414,511 | 12/1968 | Hitzman | 210—Dig. 21 |
| 3,562,153 | 2/1971 | Tully | 210—Dig. 21 |

FOREIGN PATENTS

| | | | |
|---|---|---|---|
| 1,192,063 | 5/1970 | Great Britain | 210—Dig. 21 |

CHARLES N. HART, Primary Examiner
R. BARNES, Assistant Examiner

U.S. Cl. X.R.
210—40, Dig. 21